United States Patent [19]
Kline et al.

[11] Patent Number: 5,647,531
[45] Date of Patent: Jul. 15, 1997

[54] THERMOSTATIC CONTROL VALVE SYSTEM FOR USE IN EMERGENCY SHOWER AND EYEWASH SYSTEMS

[75] Inventors: Kevin B. Kline, Indianapolis; Steven Gregory, New Palastine, both of Ind.

[73] Assignee: Lawler Manufacturing, Indianapolis, Ind.

[21] Appl. No.: 668,403

[22] Filed: Jun. 21, 1996

[51] Int. Cl.$^6$ .................................................. G05D 23/13
[52] U.S. Cl. .................................. 236/12.14; 236/DIG. 2
[58] Field of Search ............................ 236/12.14, 12.2, 236/12.21, 12.23, DIG. 2

[56] References Cited

U.S. PATENT DOCUMENTS

| | | | |
|---|---|---|---|
| 2,535,893 | 12/1950 | Branson | 236/12.14 |
| 2,855,151 | 10/1958 | Lesovsky | 236/12.14 |
| 4,475,684 | 10/1984 | Garlick et al. | 236/DIG. 2 |
| 4,923,115 | 5/1990 | Sekoguchi et al. | 236/12.14 |
| 5,011,074 | 4/1991 | Kline | 236/12.13 |
| 5,203,496 | 4/1993 | Kline | 236/12.2 |
| 5,323,960 | 6/1994 | Kline | 236/12.2 |
| 5,379,936 | 1/1995 | Kline | 236/12.2 |

OTHER PUBLICATIONS

Speakman Emergency Equipment Brochure, Speakman Company, pp. 34–37.
Guardian Equipment Emergency Eye Wash & Shower Equipment Brochure, Guardian Equipment, pp. 1–4, 6–7, 74–75.
Thermo-O-Mix Station All Weather Instant Tempered Water Supply Brochure, Thermo-O-Tech, Inc., Sep. 1995.
Streamline Catalog—Eye Wash, Portables, Eye/Face Wash, Drench Showers, Combination Units, Decontamination Models, Accessories, Western Emergency Equipment, 1993, —. 22.
Eye Wash/Showers Brochure, Lab Safety Supply, pp. 410–423.

*Primary Examiner*—William E. Tapolcai
*Attorney, Agent, or Firm*—Woodard, Emhardt, Naughton, Moriarty & McNett

[57] ABSTRACT

A thermally responsive mixing valve assembly is provided that is suitable for use in supplying tempered water to an emergency shower or eyewash system. In one embodiment, the assembly includes a valve body defining hot and cold inlets, hot and cold chambers, a mixing chamber and an outlet. The valve body supports a plurality of thermostatic valves all in fluid communication with the hot and cold liquid chambers and the mixing chamber. Each of the valves includes a thermostat operable to stroke as shuttle valve within a valve liner. The valve liner includes a number of apertures in communication with the cold liquid chamber and a bore in communication with the hot liquid chamber. The shuttle valve modulates within the valve liner to restrict hot water flow through the hot liquid bore, but the flow of cold water through the apertures is unrestricted. The valve liner also includes cold bypass slots that are normally closed by the shuttle valve but that are opened upon a failure of the thermostat. A backseat valve is also provided to terminate hot water flow into the valve on thermostat failure.

9 Claims, 7 Drawing Sheets

THERMOSTATIC CONTROL VALVE SYSTEM FOR USE IN EMERGENCY SHOWER AND EYEWASH SYSTEMS

BACKGROUND OF THE INVENTION

The present invention concerns a thermostatic or thermally controlled liquid mixing valve. In particular, the invention relates to a mixing valve that is suitable for use in an emergency shower or eyewash system.

Thermally controlled or thermostatic mixing valves are well known. Valves of this type receive both hot and cold liquid, typically water, and allow the liquids to mix to a predetermined temperature. The temperature is controlled by way of a thermally responsive control member, or thermostat, which maintains the liquid temperature according to the user's setting.

One particular application of thermostatic mixing valves is in connection with emergency shower and eyewash systems. Toxic and hazardous chemicals are used in many industrial environments. The Occupational Safety and Health Act of 1970 was enacted to assure that workers would be provided with safe and healthful working conditions. Pursuant to this act, the Occupational Safety and Health Administration adopted regulations which require the availability of emergency eyewash and shower equipment for use as a form of first aid treatment. Emergency shower and eyewash systems have proliferated in a wide range of industries, including automotive, food processing, chemical processing, petroleum refining steel production, pulp and paper, and waste water treatment. In each of these industries, workers are exposed to extremely hazardous chemicals which can cause serious tissue damage and destruction.

Many emergency shower and eyewash facilities are provided with ground water that is already tempered to a moderate temperature, normally in the range of 50°–60° F. It has been found, however, that delivered water temperatures that are too cold can have the affect of discouraging maximum effective use of the emergency equipment. For example, a worker using an emergency shower may leave the shower immediately when being deluged by a stream of 50° F. water. In addition, in northern climates, the ground water itself is typically barely above freezing, usually at 35° F. Under these circumstances, an emergency shower and eyewash system relying solely upon untempered ground water provides water that would be too cold to be endured even by a victim of a chemical accident.

As a result, emergency shower and eyewash systems have been modified to provide tempered water. Usually this comfortable range of temperatures is between 65°–95° F. In order to provide tempered water within this range, most emergency facilities include a source of very hot water, typically in the range of 140°–160° F., that is mixed with ambient ground water.

The thermostatic valves for emergency shower and eyewash systems must address certain problems. First, the source of water should not be interrupted when in use. The victim of a chemical accident will require continuous flow of water for a prolonged period of time. Typically, in the event of an accident, the affected area should be drenched for at least 15 minutes. Thus, the source of tempered water should be able to provide the water for at least that length of time and to maintain the temperature within a comfortable range for the accident victim. In addition, the thermostatic valve must be able to maintain the tempering of the water regardless of extreme fluctuations in the supply of hot or cold water to the thermostatic mixing valve.

Finally, the valve must be able to account for failures in the supply of hot or cold water to the valve, as well as failure of the valve itself. The valves must account for these failures without placing the user of the emergency shower or eyewash system in greater peril. For example, if the cold water supply fails and only hot water in the range of 140°–160° F. is provided, the user can suffer burns that may be more serious than the chemical splash that is being treated.

Thus far, no known thermostatic control valve adequately addresses all of the problems associated with providing tempered water for emergency shower and eyewash systems. While many of the systems include some provisions to account for the variety of failures that can occur, no valve is presently available that can provide virtually fail-safe performance in this arena.

SUMMARY OF THE INVENTION

The present invention contemplates a thermally controlled liquid mixing valve system that is particularly suited for use in emergency shower and eyewash systems. In the preferred embodiment, the valve system includes a cast body formed to support a pair of identical thermostatic mixing valves. The body includes inlets for hot and cold liquid, such as water, and chambers configured to communicate the hot and cold water to each of the pair of mixing valves. Typically, the hot water inlet is connected to a source of high temperature water or even a steam supply, while the cold water inlet is connected to a ground water source of a municipal water supply. The body of the valve system also includes an outlet communicating with a mixing chamber that receives hot/cold mixed water from each of the mixing valves.

In one embodiment, the mixing vanes are identical in construction and operation. In a specific embodiment, the components of the mixing valves include a thermostat housing, a thermostat mounted within the housing, a valve liner threadedly engaged to the housing, a shuttle valve reciprocatably mounted within the valve liner, and a back-seat valve threadedly engaged to the shuttle valve.

The thermostat housing defines a liquid chamber that receives the water substantially mixed. The thermostat is disposed within the liquid chamber and is preferably a bellows-type device in which an actuator stem extends and retracts in response to the liquid within the liquid chamber. The tempered water flows through outlet windows in the thermostat housing into the mixing chamber of the valve body. In the preferred embodiment, each of the pair of valves provides substantially mixed hot/cold water to the mixing chamber for output through the outlet.

The thermostatic vanes each include a valve liner component that is in fluid communication with the cold liquid chamber of the valve body. The vane liner includes a plurality of cold liquid apertures circumferentially disposed around the liner. In one embodiment, the apertures serve as the primary flow path for the cold water to be mixed with incoming hot water. The valve liner also defines a hot liquid bore communicating with the hot liquid chamber of the valve body. The liner is hollow to define a shuttle bore within which the hot and cold liquid is at least initially mixed. The shuttle bore opens into the liquid chamber of the thermostat housing so that as the hot/cold mixture flows up through the liner it becomes substantially mixed once it reaches the thermostat within the liquid chamber.

The thermostatic valves also include a shuttle valve that reciprocates within the valve liner. The shuttle valve is also hollow defining a liquid mixing bore so that water passing through the liner apertures and hot liquid bore begins to mix within the shuttle valve. The shuttle valve also includes cold bypass slots that are arranged to align with the cold bypass slots in the valve liner under certain operating conditions. In the normal operating range for one embodiment, the shuttle valve closes the bypass slots in the valve liner so that the cold water flows substantially entirely through the liner apertures. In another embodiment, the cold bypass slots in the liner and shuttle valve provide up to two-thirds of the cold water flow, depending upon the position of the shuttle valve. In this embodiment, nominally one-third of the total water flow is provided through the hot liquid bore, the cold liquid apertures and the cold bypass slots.

In the preferred embodiment, the bottom of the shuttle valve carries a shut-off disc oriented above the hot liquid bore of the valve liner. As the shuttle valve modulates within the valve liner, the distance between the shut-off disc and the hot liquid bore varies to vary the flow area available to the hot water. In addition, the shuttle valve can move to a position in which the shut-off disc completely closes the hot liquid bore to terminate hot water flow through the valve.

The backseat valve is threadedly engaged to the bottom of the shuttle valve. The backseat valve extends through the hot liquid bore in the valve liner and includes a backseat ring adjacent the bore. The backseat ring is positioned on the opposite side of the hot liquid bore from the shut-off disc. The backseat valve is provided to completely shut-off hot liquid flow in the vent of a failure of the thermostat.

In the preferred embodiment, the actuator stem of the thermostat acts against the backseat valve through a bias spring. Since the backseat valve is attached to the shuttle valve, movement of the backseat valve in response to the thermostat is directly translated to the shuttle valve. In one aspect of the invention, a return spring is disposed between the shuttle valve and the valve liner to provide a return force through the shuttle valve to the backseat valve. In the event of a failure of the thermostat, the thermostat actuator will no longer control the position of the backseat valve and shuttle valve. The return spring ensures that the shuttle valve will pull the backseat ring of the backseat valve against the hot liquid bore to terminate the flow of hot water into the valve.

The present inventive vane assembly includes safety features that are highly beneficial for use with emergency shower and eyewash systems. For example, one feature is embodied in the multiple thermostatic valves housed within a common valve body in mutual fluid communication with the hot and cold liquid inlets and the mixed liquid outlet. If one thermostatic valve fails, the other valve continues to operate, providing properly tempered water.

In another feature, the backseat valve accounts for a failure of the thermostat. If the thermostat is unable to regulate the flow of hot water relative to the cold water, the risk exists that the temperature of the outlet water will be too high for use by the victim. Under this circumstance, it is essential that the hot flow be terminated, while maintaining the flow of cold water to the emergency shower or eyewash system.

A further safety feature of the present invention resides in the shut-off disc that is oriented over the hot liquid bore. If the flow of cold water is interrupted or compromised, the thermostat will stroke the shuttle valve to cause the shut-off disc to completely close the hot liquid bore, terminating the hot water flow through the valve. In the event of a cold water failure, the victim must be protected from scalding and tissue burns that may occur if only high temperature water exits the valve assembly. In this instance, it is perceived to be better to the victim to terminate the flow of water rather than to expose the victim to possibly 160° F. water.

It is one object of the present invention to provide a thermally responsive mixing valve assembly that is usable to provide tempered water to an emergency shower or eyewash system. A further object resides in features of the invention that provided virtually fail-safe tempered water to the victim.

One benefit realized by the inventive thermostatic valve system is achieved by the redundant valves providing mutual tempered liquid to the outlet of the valve assembly. Another benefit is that the valve assembly prevents the flow of high temperature water to the accident victim to avoid the risk of scalding and tissue burns.

Other objects and benefits of the present invention will become apparent from a reading of the following written description and accompanying figures.

DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

The present invention concerns a thermostatic mixing valve particularly suited for use in emergency shower and eyewash systems. The valve assembly according to one aspect of the present invention provides a redundant valve system in which a single casting carries a plurality of identical thermostatic mixing valves. Hot and cold liquid, such as water, is provided to the valves, and each of the valves tempers the outlet of liquid to a predetermined temperature suitable for use in an emergency shower and eyewash system. In addition, the inventive valve assembly provides means for stopping the flow of hot liquid into the valves in the event of an interruption or failure of the supply of cold liquid to the valve assembly. Each of the valves in the valve assembly also includes a backseat for accounting for failure of the thermostatic itself. In accordance with a further aspect of the invention, the thermostatic valves are configured so that cold liquid always flows through the valve, absent an interruption of the cold liquid to the valve assembly.

Figure 1:
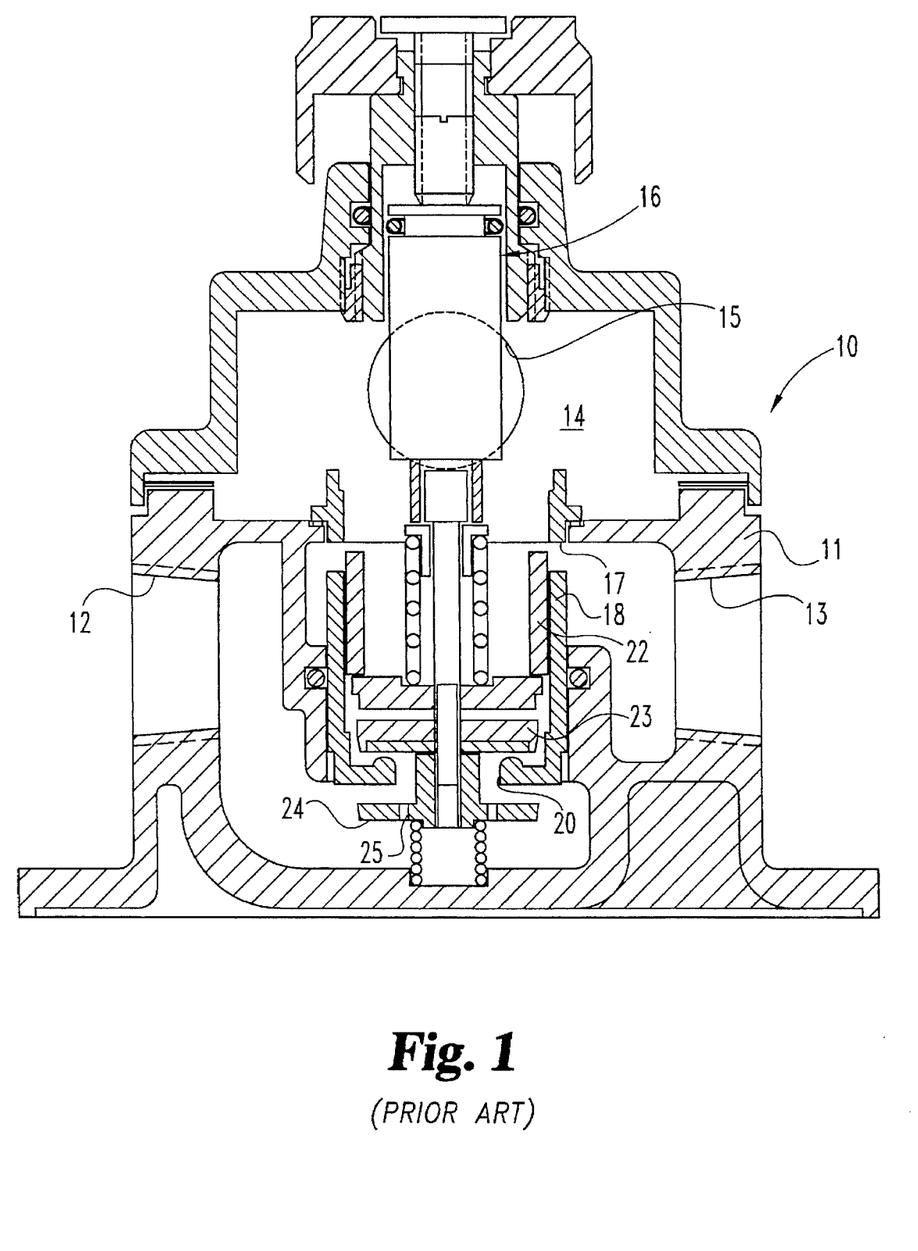
FIG. 1 is a side cross-sectional view of a prior art thermally controlled mixing valve assembly.

By way of background, one type of prior art thermostatic mixing valve assembly is shown in FIG. 1. This valve is more completely shown and described in U.S. Pat. No. 5,011,074, owned by the Assignee of the present application. In this prior mixing valve assembly 10, a valve body 11 defines a hot inlet 12, a cold inlet 13, a mixing chamber 14 and an outlet 15. Hot and cold liquid entering the respective inlets 12, 13, are controllably mixed within the chamber 14 so that a temperature conditioned liquid exits through outlet 15. A thermostat 16 is provided to modulate the valve components to control the amount of cold and hot water entering the mixing chamber 14.

In this prior art mixing valve assembly, a liner 18 defines slots 19 through which the cold water flows, and a lower opening 20 through which the hot water flows. A shuttle 22 reciprocates within the liner to variably open or close the slots 19 in response to actuation of the thermostat 16. A valve disc 23 is also connected to the thermostat 16 so that it modulates over the opening 20 to control the amount of hot water entering the mixing chamber 14. In accordance with one aspect of the invention in this prior U.S. Patent, a backseat 24 is provided which accounts for failure of thermostat 16. In the event of failure, the liquid pressure and the return spring 89 push the backseat 24 against an closing the opening 20 to prevent the flow of hot water into the system. In another aspect of this prior art valve assembly 10, a number of bleed orifices 25 are provided in the backseat so that some hot water flow is maintained to mix with the cold water entering the mixing chamber. While this prior art valve assembly 10 is suitable for providing tempered water, it does not include the range of fail-safe protection that is preferred for emergency shower and eyewash systems. For example, if the hot water source fails, the shuttle 22 is stroked upward to completely close the cold input slots 19, so that no liquid flows from the valve assembly. Further, in the vent of a failure of both the thermostat 16 and the cold water supply, only high temperature water would be provided by the valve assembly due to the presence of the bleed orifices 25.

Figure 2:
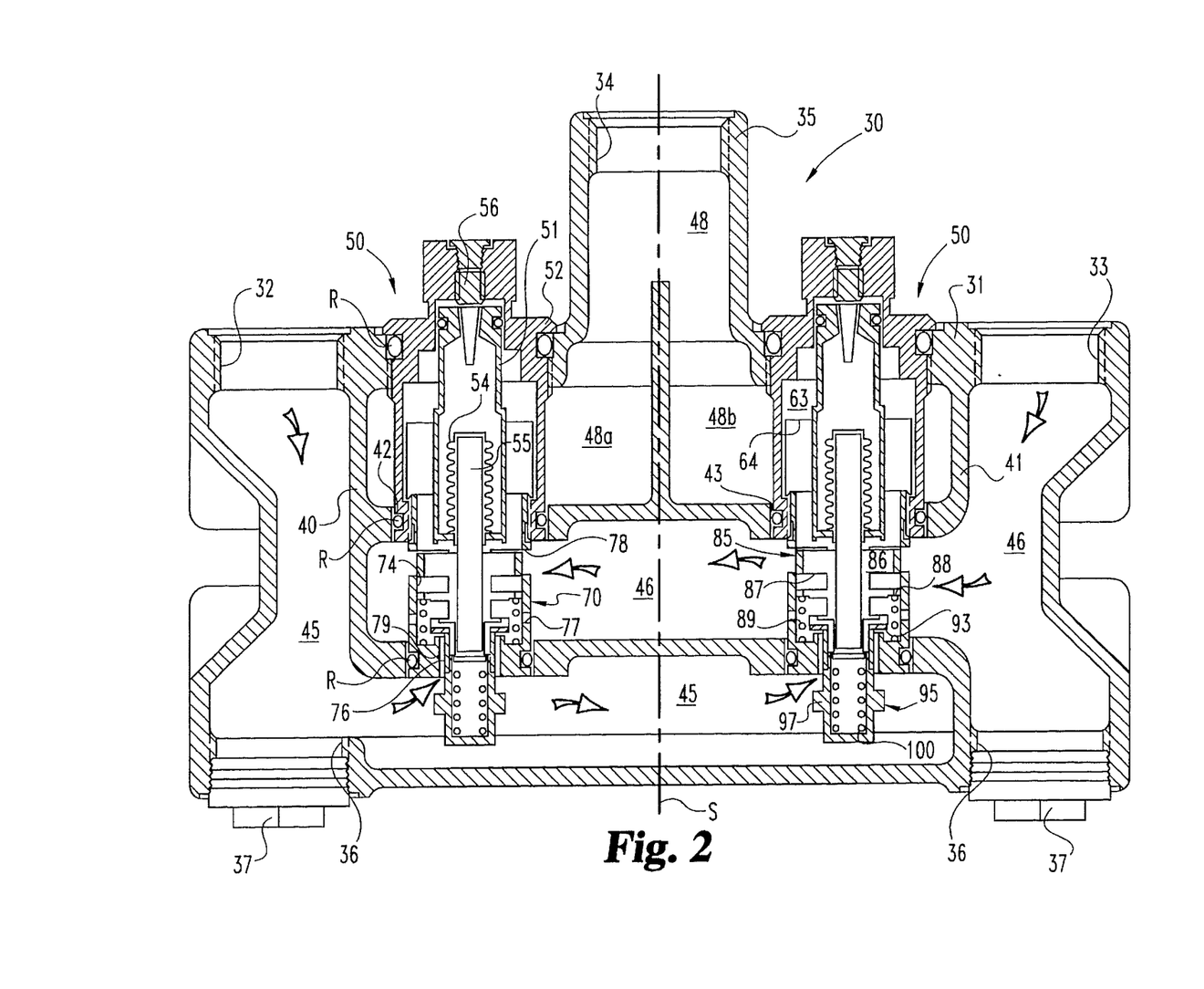
FIG. 2 is a side cross-sectional view of a thermally controlled mixing valve assembly according to one embodiment of the present invention.

A valve assembly that does meet these requirements is the valve assembly 30 in accordance with the present invention. The valve assembly 30 includes a valve body 31 which includes a hot liquid inlet 32, a cold liquid inlet 33 and a mixed liquid outlet 34. The outlet 34 is defined in part by an outlet conduit 35 which can be integral with or attached to the valve body 31. The outlet 34 can be engaged to a system or apparatus requiring the tempered liquid, such as an emergency shower or eyewash system.

Preferably, the valve body is configured so that it can be formed in a typical casting procedure, such as sand casting. In that regard, the valve body 31 can include a pair of casting relief openings 36 at an opposite side of the casting from the respective hot and cold liquid inlets 32, 33. A plug 37 can then be provided to close the relief openings 36.

In the embodiment of the invention depicted in FIG. 2, the casting 31 includes a first valve support 40 and a second valve support 41. As can be seen from this figure, the hot liquid inlet 32 communicates with a hot liquid chamber 45 that extends between the first and second valve supports 40, 41. In particular, the hot liquid chamber 45 fluidly communicates with the valve bores 42, 43 defined by each of the supports. Likewise, the cold liquid inlet 33 communicates with a cold liquid chamber 46 that extends between and in fluid communication with the two valve bores 42, 43.

It is understood that the valve body 31 can be formed in a variety of configurations. For example, the valve body can be configured to support more than two thermostatic mixing valves in order to provide multiple levels of redundancy to the valve assembly. It is important, however, that the hot liquid chamber 45 and cold liquid chamber 46 surround all of the thermostatic valves 50 disposed within corresponding valve bores, such as bores 42, 43, so that the hot and cold liquid, such as water, can be provided evenly and equally to all of the thermostatic valves.

The valve body 31 also defines a mixing chamber 48 that is disposed within the outlet conduit 35 in the preferred embodiment. The valve body forms mixing chamber portions 48a, 48b that directly communicate with each of the two thermostatic valves to receive tempered water from each of the valves. Each of the thermostatic valves provide separately tempered water to the general mixing chamber 48 for further mixing.

In accordance with one aspect of the present invention, the valve assembly 30 includes a plurality of identical thermostatic mixing valves 50. In the illustrated embodiment, two such valves are provided. Preferably, each of the mixing valves 50 is of identical construction and each is calibrated to provide tempered liquid to their respective mixing chamber portions 48a, 48b at the same temperature. This redundancy means that if one valve should completely fail, the other vane will still be providing tempered water through the outlet 34 and ultimately to the emergency shower or eyewash system. While failure of a thermostatic valve is rare, it is certainly much more rare to have multiple failures in one valve assembly, absent a failure of the sources of hot and cold liquid. This aspect of the present invention provides a much greater degree of safety than any prior thermostatic mixing valve assembly, which is crucial when the valve is used in connection with an emergency shower and eyewash system where a loss of water flow could be extremely hazardous.

In accordance with the present invention, each of the thermostatic valves 50 includes a thermostat 51 mounted within a thermostat housing 52. Preferably, the thermostat includes a bellows 54, an actuator stem 55 and an adjustment pin 56. The adjustment pin is used to control the set temperature of the thermostat 51. The operation of a bellows thermostat is well known. It is understood that as the liquid temperature surrounding the thermostat 51 increases, the bellows operates to extend the actuator stem 55, while under the opposite circumstance in which the thermostat is surrounded by cold water, the actuator 55 retracts.

Preferably, the thermostats 51 of each of the thermostatic mixing valves 50 included in the assembly 30 are all identically calibrated and are all at the same set temperature. It is contemplated that the thermostats could be different between the plurality of mixing valves, or could be set at different control temperatures. In accordance with the preferred embodiment of the invention, the liquid exiting each thermostatic valve 50 and exiting the assembly at outlet 34 are all at the same temperature. However, it is expected that under some circumstances, additional mixing of the liquids may occur in the mixing chamber 48 so that the temperatures of the liquids exiting the plurality of valves and the assembly outlet are all different.

Figure 3:
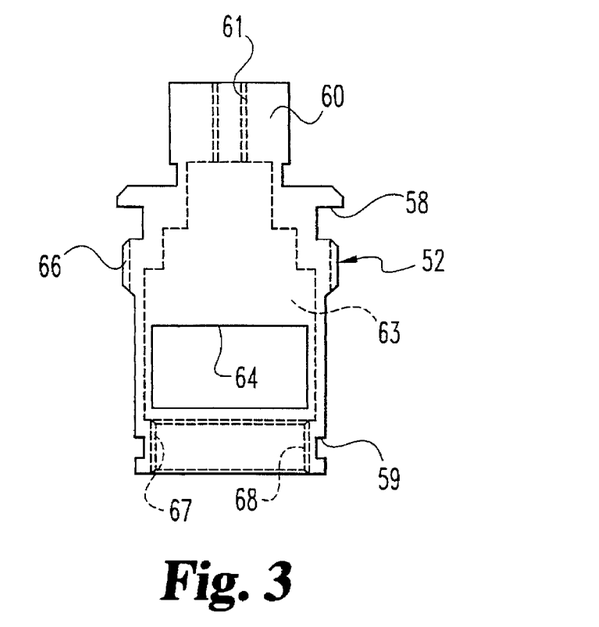
FIG. 3 is a side elevational view of a thermostat housing used with the thermostatic valve assembly depicted in FIG. 2.

Details of the thermostat housing 52 are shown in FIG. 3. In particular, the housing defines an upper seal ring groove 58 and a lower seal ring groove 59, each configured to receive an elastomeric gasket or seal ring R of conventional design. A boss 60 is provided at the top of the housing 52 through which an adjustment pin bore 61 is defined. The bore 61 and the adjustment pin 56 include mating threads so that the pin can be adjusted in or out against the bellows thermostat 51 to alter the stroke of the actuator pin relative to the remaining valve components. The thermostat housing 52 defines a liquid mixing chamber 63 with an outlet window 64 that communicates with the mixing chambers 48a, 48b.

The thermostat housing 52 also includes external mating threads 66 adjacent the upper sealing groove 58. These external grooves 66 mate with corresponding internal threads defined in the valve body 31, and specifically in the first valve and second valve supports 40, 41. When the complete valve assembly 30 is constructed, the thermostat housing 52 is threaded into one of the corresponding valve bores 42, 43 with the seal rings in position within the respective seal ring grooves 58, 59.

The thermostat housing 52 also includes internal mating threads 67 defined in a lower receiver bore 68. The function of these two elements of the thermostat housing 52 will be discussed further herein.

Figure 4:
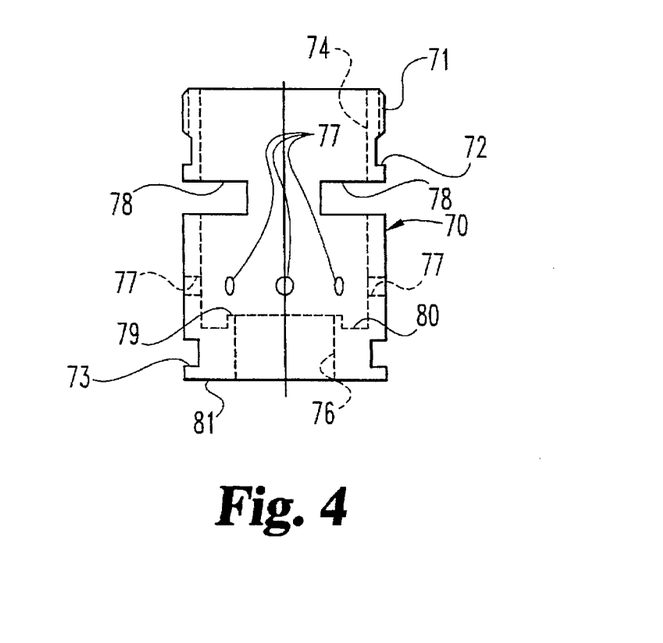
FIG. 4 is a side elevational view of a valve liner used with the thermostatic valve assembly of the present invention.

Referring again to FIG. 2, each of the thermostatic valves 50 includes a valve liner 70 that is also concentrically disposed within a corresponding one of the valve bores 42, 43. Details of the valve liner are shown in FIG. 4. In particular, the valve liner 70 can include external mating threads 71 at its upper end, which threads engage the internal threads 68 of the thermostatic valve 50. The liner 70 includes a thread stop 72 that abuts the external threads of the housing when the liner is fully engaged to the thermostat housing 52. The valve liner 70 preferably includes a seal ring groove 73 at the opposite end of the liner from the threads 71. The seal ring groove 73 can receive a conventional seal ring R to provide a sealing engagement with the first valve and second valve supports 40, 41.

The valve liner 70 is hollow and defines a shuttle bore 74 extending partially through the liner. Cold liquid apertures 77 are formed around the outer circumference of the liner and communicate directly with the shuttle bore 74. Likewise, cold bypass slots 78 are cut into the liner 70 above the cold liquid apertures 77.

The valve liner 70 also defines a hot liquid bore 76 which is concentric and communicates with the shuttle bore 74. The shuttle bore 74 terminates essentially at the beginning of hot liquid bore 76. At this location, the liner 70 includes an annular spring seat 80 which is concentrically disposed around hot liquid bore 76. In addition, the liner 70 defines a backseat surface 81 at its bottom end. The arrangement of these components of the valve liner 70 can be seen more clearly with respect to FIG. 2. For instance, when the liner 70 is fully threadedly engaged with the thermostat housing 52, the cold liquid bypass slots 78 are situated at the upper end of the cold liquid chamber 46. In addition, the cold liquid apertures 77 are in communication with the cold liquid chamber 46. The hot liquid bore 76 opens into the hot liquid chamber 45 so that liquid can be communicated through the bore 76 and up through the shuttle bore 74 of the valve liner 70.

Figure 5:
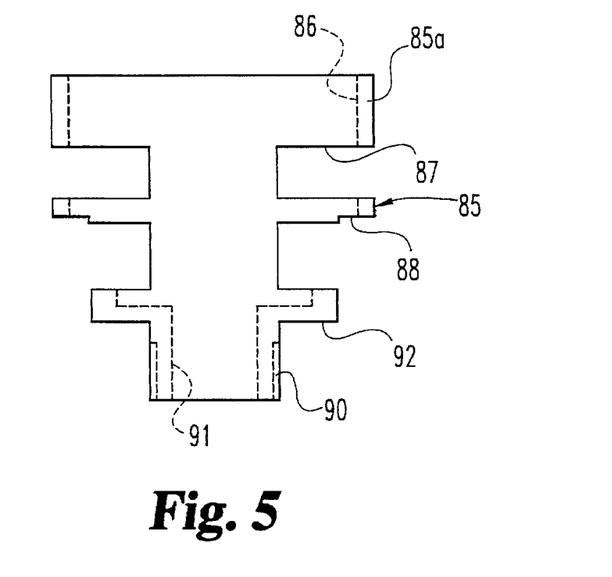
FIG. 5 is a side elevational view of a shuttle valve used with the thermostatic mixing valve assembly of the present invention.

Again referring to FIG. 2, the thermostatic valve includes a shuttle valve 85 that is slidably and concentrically disposed within the valve liner 70. Details of the shuttle valve 85 are shown in FIGS. 2 and 5. In particular, the shuttle valve 85 defines a liquid mixing bore 86 therethrough. In the preferred embodiment, a number of cold bypass slots 87 are cut through the shuttle valve 85 opening into the liquid mixing bore 86. The valve 85 also includes a spring seat 88 against which a return spring 89 (FIG. 2) contacts. The return spring 89 is disposed between the spring seat 88 of the shuttle valve 85 and the spring seat 80 of the valve liner 70. The return spring normally pushes the shuttle valve 85 upward so that upper surface 85a of the valve substantially closes the cold bypass slots 78 in the valve liner 70.

Figure 6:
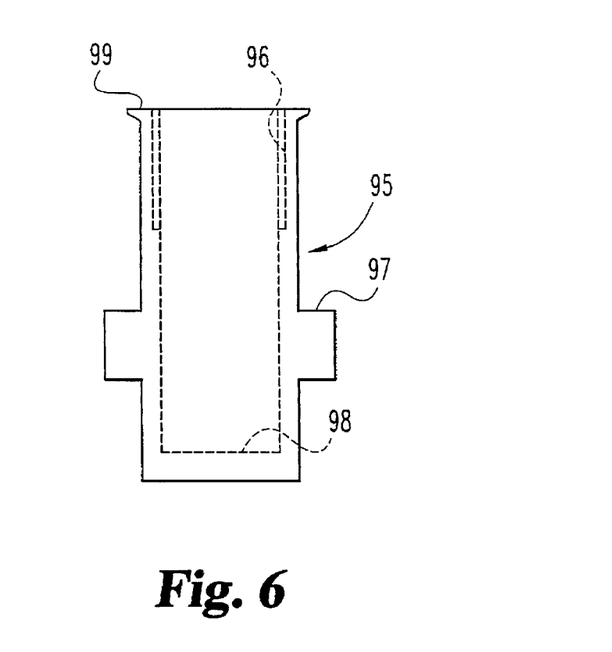
FIG. 6 is a side elevational view of a backseat valve used with the thermostatic mixing valve depicted in FIG. 2.

The shuttle valve 85 further includes external mating threads 90 and an actuator stem bore 91 (FIG. 6). The external threads 90 mate with the backseat valve 95 described in more detail herein. The actuator stem bore 91 receives the actuator stem 55 of the thermostat 51 therethrough. The shuttle valve 85 further includes an annular shut-off surface 92 which is arranged as shown in FIG. 2 to close the hot liquid bore 76 of the valve liner 70.

The backseat valve 95 is depicted in FIG. 2 and is shown in more detail in FIG. 6. The backseat valve 95 includes internal mating threads 96 which engage the external threads 90 of the shuttle valve. The backseat valve 95 defines a backseat ring 97 which contacts the backseat surface 81 of the valve liner 70 to close off flow of hot liquid through the hot liquid bore 76. This backseat valve 95 is intended to operate in a manner similar to the backseat valve 80 described in the previously mentioned U.S. Pat. No. 5,011,074. In particular, the backseat valve member and its function are described in the '074 Patent at column 5, lines 37–64, which description and accompanying figures are incorporated herein by reference.

The backseat valve 95 includes a spring bore 98 within which a bias spring 100 resides. The bias spring 100 contacts and provides a resistive force to the actuator stem 55 of the thermostat 51.

The backseat valve 95 also includes a disc clamping surface 99 facing the shuttle valve 85. A shut-off disc 93 is clamped between the shut-off surface 92 of shuttle valve 85 and the clamping surface 99 of the the backseat valve 95 when the backseat valve is threadedly engaged to the shuttle valve.

The thermostatic valve 50 of the present invention can be readily assembled by first placing the bias spring 100 within the spring bore 98 of the backseat valve 95. The backseat vane is extended through the hot liquid bore 76 of the valve liner 70. With the shut-off disc 93 concentrically disposed against the clamping surface 99 of the backseat valve, the shuttle valve 85 is then threaded onto the backseat valve 95 at their respective mating threads 90, 96. In this arrangement, the backseat ring 97 of the backseat valve is situated within the hot liquid chamber 45 and on the opposite side of the hot liquid bore 76 from the shut-off disc 93. It is understood that prior to threading the shuttle valve 85 onto the backseat valve 95, the return spring 89 must be situated within the spring seat 80 of the valve liner 70 and against the spring seat 88 of the shuttle valve 85.

In the next step of the assembly, the thermostat 51 is disposed within the thermostat housing 52. The valve liner 70 is then threadedly engaged with the thermostat housing 52 in the manner previously described. At this point, the actuator stem 55 is extended through the actuator stem bore 91 of the shuttle valve 85 and into the spring bore 98 of the backseat valve 95 to contact the bias spring 100. Finally, the thermostat housing 52 is threaded into the valve body 31 to complete the assembly of the thermostatic valve 50. The complete thermostatic valve 50 is then engaged within each of the valve bores 42, 43 by threading the housing into the bores at threads 66.

Figure 7:
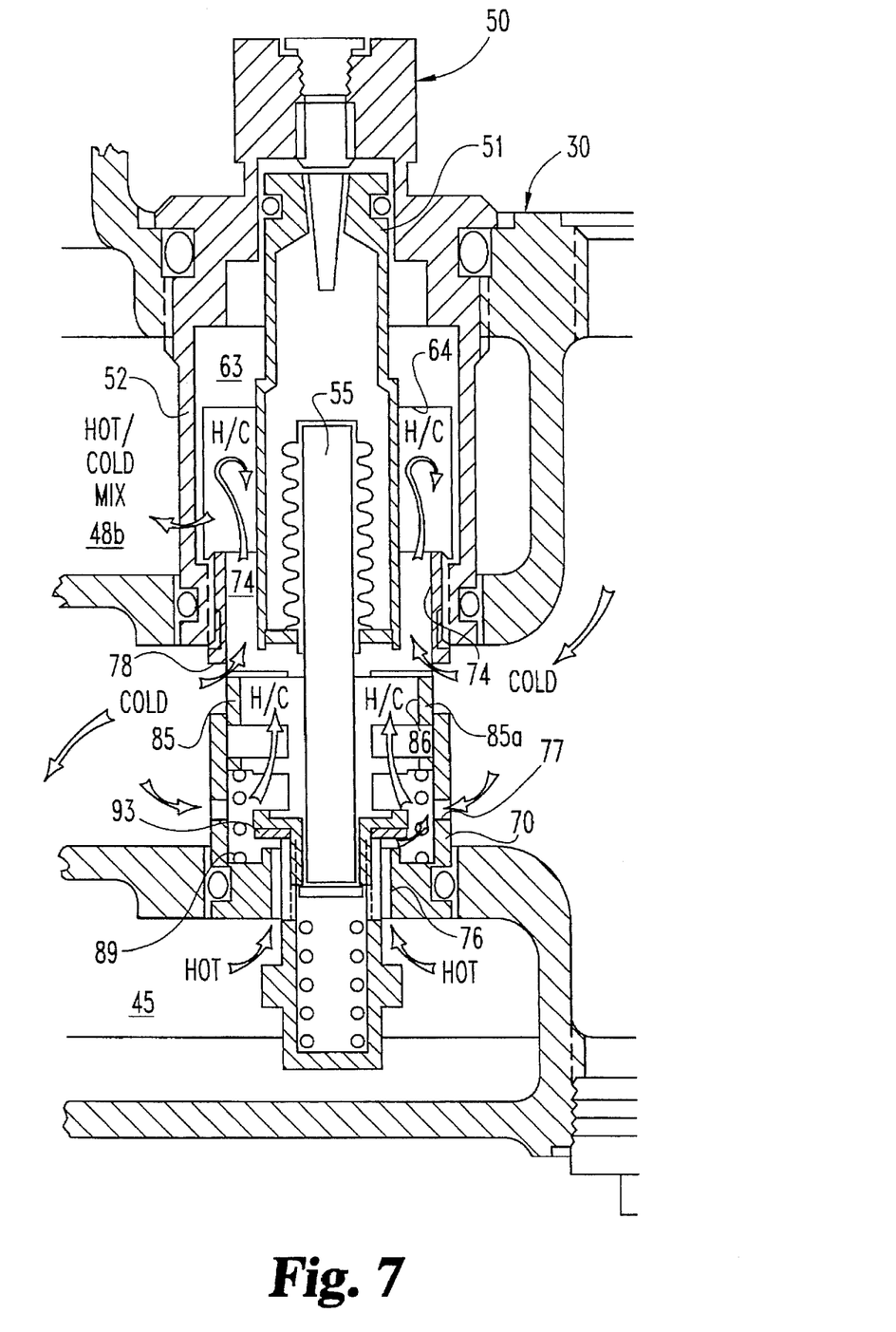
FIG. 7 is an enlarged partial cross-sectional view of one thermostatic valve situated within the valve assembly of FIG. 2, showing the normal liquid flow condition.
Figure 8:
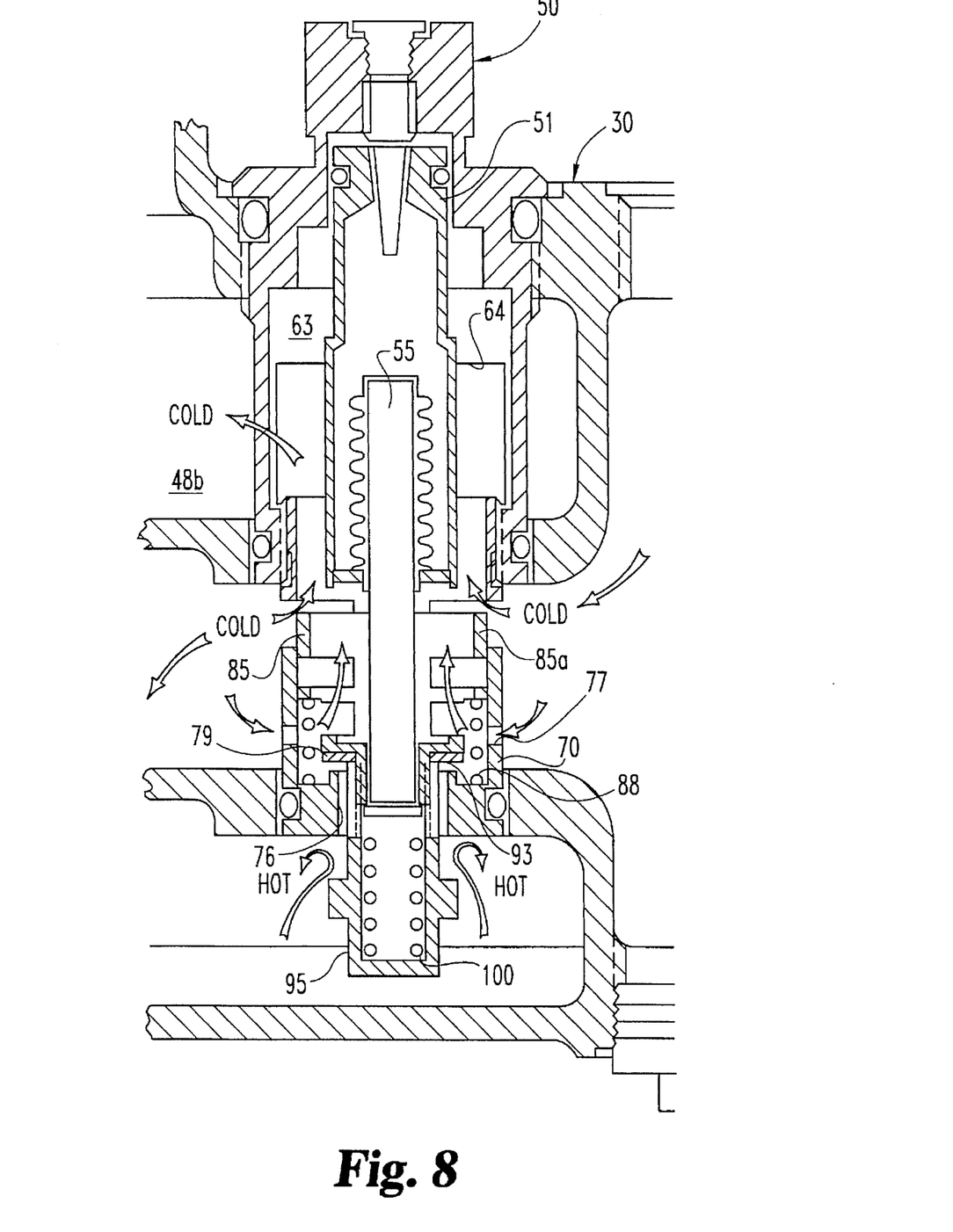
FIG. 8 is an enlarged partial cross-sectional view of one thermostatic valve situated within the valve assembly of FIG. 2, showing a condition in which the hot water flow is shut off.
Figure 9:
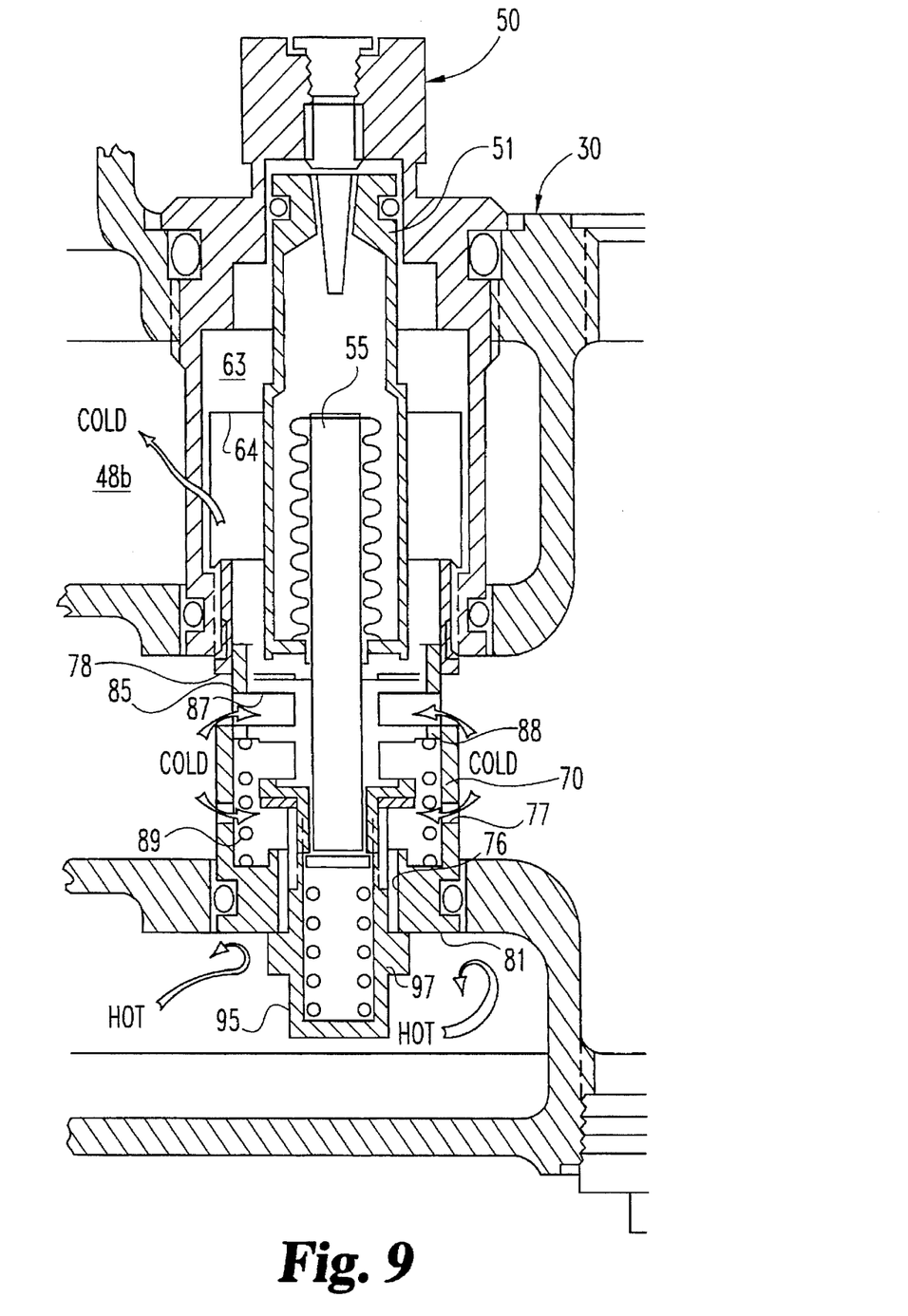
FIG. 9 is an enlarged partial cross-sectional view of one thermostatic valve situated within the valve assembly of FIG. 2, showing a response of a valve to a thermostat failure condition.

The operation of the thermostatic mixing valve assembly 30 of the present invention is depicted in FIGS. 7–9. In FIG. 7, the normal operation of the valve assembly is shown. For the purposes of this illustration, normal operation occurs when both hot and cold water is flowing into the valve assembly 30, with the water being discharged from the valve assembly at a pre-set temperature. As can be seen in FIG. 7, the hot water enters through chamber 45 and through hot liquid bore 76 in the valve liner 70. In this configuration, the shut-off disc 93 is separated from the hot shut-off seat 79 of the valve liner so that some hot water is free to flow around the shuttle valve 85 and into the liquid mixing bore 86 of the shuttle valve.

Likewise, the cold water flows through cold liquid chamber 46 and through the cold liquid apertures 77 in the valve liner 70. The cold water then passes through the liquid mixing bore 86 of the shuttle valve, to at least partially mix with the hot water flowing in from the bottom of the shuttle valve. This at least partially water mixed flows upward toward the thermostat 51.

In the position shown in FIG. 7, the shuttle valve 85, and specifically the cylindrical portion 85a, may not completely close the bypass slots 78 in the valve liner 70. Thus, the cold water also leaks or trickles around the top of the shuttle valve 85 into the valve liner 70. The hot and cold mixture then mixes with the cold trickle in the shuttle bore 75 of the valve liner 70, as the mixed liquid passes around the thermostat 51. Typically, the shuttle valve will modulate between completely closing the bypass slots 78 and permitting trickle flow through the slots.

The hot and cold mixture then further mixes in mixing chamber 63 of the thermostat housing 52, finally exiting through the outlet windows 64 in the housing. The completely mixed hot and cold water, which is now a tempered mixture, enters the final mixing chamber 48b to exit the valve assembly. It is understood, of course, that the operation of the mixing valve 50 is indicative of the operation of all the thermostatic valves of the valve assembly 30 as shown in FIG. 2.

As the temperature of either the inlet hot water or inlet cold water varies, the thermostat 51 will modulate the actuator stem 55 in response to the temperature within the liquid chamber 63 of the thermostat housing 52. For example, if the hot water temperature increases relative to the cold water, the temperature of the complete mixture will increase causing the actuator 55 to extend away from the thermostat 51. This extension then narrows the space between the shut-off disc 93 and the shut-off seat 79, to thereby reduce the amount of hot water flowing in to mix with the cold water. As the temperature of the mix decreases below the set temperature, the actuator 55 will retract, as assisted by the return spring 89, to thereby open the flow for the hot water to mix with the cold water.

It can be perceived that throughout the normal operating range, most of the cold water will be flowing through the cold water apertures 77 in the valve liner 70. Thus, it is contemplated that the cold water flow will be substantially constant regardless of the temperature of the cold water. In other words, even as the temperature of the cold water changes with respect to the hot water, the amount of cold water flowing through the thermostatic valve 50 remains substantially constant under normal operating conditions. This feature can be important in emergency shower or eyewash systems where substantially continuous and constant flow of water is necessary. For example, in some emergency shower systems, the flow rate must be at least 30 g.p.m. for fifteen minutes. In many instances cold water is provided to the valve system 30 at a substantially constant 30 g.p.m. Thus, since the thermostatic valves 50 of the present invention do not restrict cold liquid flow into the valve, the mixed water will exit at substantially the 30 g.p.m. of the input cold flow. It is understood that the shuttle bore diameter, the area of the outlet windows 64 of the thermostat housing and the outlet conduit 35 are sufficiently large to avoid impacting the flow rate of the water discharged from the valve assembly 30.

In an abnormal condition, the cold water flow can substantially diminish relative to the hot water flow, or the temperature of the cold water flow can increase excessively relative to its normal expected temperature (usually in the range of 55°–65° F.). Under these conditions, as depicted in FIG. 8, the thermostat stem 55 of the thermostatic valve 50 will stroke farther from the thermostat 51. As the stem 55 extends, it pushes the bias spring 100, which in turn pushes the backseat valve 95. The backseat valve pulls the shuttle valve 85 down against the operation of the return spring 88. As the actuator stem 55 strokes farther, the shut-off disc 93 gradually restricts the hot water flow from the hot liquid bore 76. Ultimately, the disc contacts the hot shut-off seat 79 to completely close the hot liquid bore 76. Under this condition, the hot flow is terminated completely so that only cold water flows into the liquid chamber 63 and through the outlet window 64 into the mixing chamber 48b. When the shut-off disc 93 is in full contact with the hot shut-off seat 79, further modulation of the thermostat stem 55 simply pushes against the bias spring 100 to avoid any damage to or failure of the thermostat 51.

A third mode of operation of the thermostatic valve 50 according to the present invention is shown in FIG. 9. In this circumstance, the thermostat 51 fails so that the actuator 55 is inoperable. In this condition, the return spring 89 pushes against the spring seat 88 of the shuttle valve 85 to push the shuttle valve upward toward the thermostat 51. As the shuttle valve 85 moves upward, it pulls the backseat valve 95 upward since the backseat valve is in threaded engagement with the shuttle valve 85. This movement continues until the backseat ring 97 of the backseat valve 95 contacts the backseat surface 81 of the valve liner 70. In this condition, the hot liquid bore 76 is once again closed so that no hot liquid flows through the thermostatic valve 50 and through the mixing chamber 48b.

In addition, under the failure condition depicted in FIG. 9, the shuttle valve translates upward until the cold bypass slots 87 of the shuttle valve 85 coincide with the cold bypass slots 78 in the valve liner 70. In this arrangement, the cold flow is substantially increased since it no longer flows into the mixing chamber solely through the apertures 77. In this circumstance, the flow rate leaving the thermostatic valve assembly 30 is not diminished relative to the normal flow condition.

It should be appreciated that the present inventive thermostatic valve assembly, 30 provides virtually fail-safe tempered water that is suitable for use in an emergency shower or eyewash system. In its normal operating position, the valve provides perfectly tempered water at a requisite flow rate as the hot water passes through the hot liquid bore 76 and the cold water passes through the cold liquid aperture 77 in the valve liner 70. The provision of the cold flow aperture 77 ensures that cold water is always flowing through the valve, or that the cold flow is always open. This feature helps eliminate temperature spikes that may occur as the temperature of the hot water fluctuates. In other words, the provision of the cold liquid aperture 77 helps eliminate the effect of hot shots that can be prevalent when the hot water is provided from a steam source.

Preferably, each of the valve liners 70 includes 6–8 apertures 77 uniformly distributed around the circumference of the valve liner 70. In a specific embodiment, these apertures have a diameter of about ⅛ inch to ensure adequate cold flow at all times.

One fail-safe aspect of the thermostatic valve assembly 30 of the present invention is the ability to completely stop the flow of hot water under certain failure conditions. For instance, if the flow of cold water ceases or is substantially diminished, there would generally be insufficient cold water to mix with the high temperature water to avoid scalding and burning the user of an emergency shower or eyewash system. Under these circumstances, it is essential that the flow of hot water be cut off immediately. It is certainly preferable to avoid injury to the victim of the chemical accident that might occur by providing scalding water.

Another fail-safe aspect of the invention resides in the thermostatic valve redundancy. If one of the multiple thermostatic valves 50 supported in the valve body 31 fails, it is certainly unlikely that another valve will also fail. Thus, the normally operating thermostatic valves will continue to provide tempered water to the emergency shower and eyewash system. The failed valve will provide cold water only to be mixed with the tempered water from the remaining fully functional valves. In a specific embodiment, the mixing chambers can be formed to fully communicate between each of the multiple thermostatic valves so that the thermostats of the valves is exposed to the composite I of the tempered water discharged from the valves. This arrangement can allow the functioning valves to compensate for the cold-only flow from the failed valve to ensure that the temperature of the discharge from the valve assembly is at the predetermined set temperature.

A further fail-safe attribute of the present invention is the provision of the backseat valve 95. This backseat valve operates on the failure of the thermostat, rather than on failure of the cold water source. If the thermostat fails it is unable to regulate the relative flows between the hot and cold water. It is therefore necessary that the hot water flow be shut off completely. On the other hand, it is also important that some water keep flowing through the system, even if it is uncomfortably cold. The effects of uncomfortably cold water are not as injurious as the effects of uncomfortably hot water, so it is believed to be acceptable to allow the cold water to continue to flow through the valve assembly 30.

The materials and dimensions of each of the components of the present inventive valve assembly 30 can be determined by persons of skill in this art. However, by way of specific example, the valve body 31 is cast from bronze. The hot and cold liquid inlets preferably are of a standard threaded diameter to receive threaded tubes or hoses typical in the industry. In one specific example, the inlets have an inner diameter of 1¼ NPT. The valve bores 42 and 43, which receive the thermostatic mixing valves 50, have a diameter of 1.89", in one specific embodiment. The thermostat housing 52 is appropriately sized to fit within the valve bores 42, 43. The liquid mixing chamber 63 of the thermostat housing 52 can have a diameter of about 2.0", while the shuttle bore 74 of the valve liner 70 can have a diameter of 1.5". The thermostat housing 52 preferably includes a pair of diametrically opposed outlet windows 64 having a height of about 1" and spanning the majority of the circumference of the housing.

In the valve liner, the cold bypass slots 78 have a height of about 0.30". Preferably, the liner includes two such diametrically opposed slots that occupy about ⅔ of the circumference of the liner. The cold bypass slot 87 in the shuttle valve 85 also occupy substantially the same circumferential length of the valve. These slots in one specific embodiment have a height of 0.25".

The flow of the hot liquid into the vane assembly is determined by the difference in the diameters of the hot liquid bore 76 and the outer diameter of the backseat valve 95. In one specific embodiment, the hot liquid bore 76 has an inner diameter of 0.95". The outer diameter of the backseat valve 95 that extends through the hot liquid bore is, in one specific embodiment, 0.75". It should be understood, however, that the flow area between these two components is not determinant of the actual flow area available for hot liquid flow. Instead, the modulation of the shut-off disc 93 relative to the hot shut-off seat 79 will control the hot liquid flow area. In addition, the hot liquid flow rate is controlled by the distance between the backseat ring 97 and the backseat surface 81. When the two surfaces restricting the flow of hot water through the thermostatic valve 50 are equidistant relative to the hot liquid bore 76, the maximum hot water flow area is equal to or slightly less than the cold water flow area available through the apertures 77.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. For example, while the preferred material for the components of the mixing valve is stainless steel, other materials are contemplated that are suited for use in a liquid environment.

In a further modification of the preferred embodiment, the stroke of the shuttle valve 85 can be arranged to permit greater consistent flow of cold water through the cold bypass slots 78 in the valve liner 70. Within the normal operating range, the shuttle valve can oscillate past the bypass slots 78 to vary the degree of opening of the slots to the valve bore 74. In this modified embodiment, most of the flow is provided through the cold bypass slots, rather than through the cold liquid apertures 77. The number of these apertures can be reduced to 4–6 with a diameter of 3/32 in. In one specific embodiment, only four such apertures are provided so that about two-thirds of the cold flow is provided through the bypass apertures. Even in this embodiment, the bypass slots can still be shut off by the shuttle valve.

Further, the preferred embodiment contemplates a singly redundant system utilizing two identical mixing valves. Alternatively, three or more mixing valves may be provided, with appropriate modifications to the valve body to support the multiple valves in proper fluid communication. In addition, each of the multiple mixing valves need not be of identical construction, provided that each valve is capable of thermostatically mixing hot and cold liquid to a predetermined temperature.

What is claimed is:

1. A thermally responsive mixing valve assembly comprising:
   a valve body defining a hot liquid inlet communicating with a hot liquid chamber, a cold liquid inlet communicating with a cold liquid chamber, and a discharge outlet communicating with a liquid mixing chamber;
   a plurality of thermally responsive valves supported within said valve body, each in communication with the hot liquid chamber, the cold liquid chamber and the mixing chamber, each of said valves including;
     a first opening communicating with said hot liquid chamber;
     a second opening communicating with said cold liquid chamber;
     a liquid chamber communicating with said first and second openings;
     a thermally responsive control member disposed within said liquid chamber; and
     a valve component operatively coupled to said control member to control the flow of liquid through at least one of said first and second openings into said liquid chamber, whereby said control member moves said valve component in response to the temperature of liquid within said liquid chamber.

2. The thermally responsive mixing valve assembly of claim 1, wherein said thermally responsive control member is a bellows thermostat having an actuator stem coupled to said valve member.

3. The thermally responsive mixing valve assembly of claim 1, wherein said valve member is configured to permit unrestricted flow through said second opening into said thermostatic valve.

4. The thermally responsive mixing valve assembly of claim 1, wherein said valve member includes a shut-off seat arranged to close said first opening to interrupt the flow of hot liquid through said first opening into said thermostatic valve.

5. The thermally responsive mixing valve assembly of claim 4, wherein said valve member is configured to permit unrestricted flow through said second opening into said thermostatic valve.

6. A thermostatic mixing valve comprising:
   a housing defining a liquid chamber;
   a thermally responsive control member disposed within said liquid chamber and having an actuator operable in response to the temperature of liquid within said liquid chamber;
   a hollow valve liner defining a number of apertures in communication with a first source of relatively colder liquid and defining a first bore in communication with a second source of relatively hotter liquid, said liner further defining a shuttle bore in fluid communication between said liquid chamber and said number of apertures and said first bore; and
   a shuttle valve disposed within said shuttle bore and operably coupled to said actuator, said shuttle valve configured to variably restrict the flow of liquid through said first bore in response to movement of said thermostat actuator without restricting the flow of liquid through said number of apertures.

7. The thermostatic mixing valve of claim 6, wherein:
   said valve liner defines a number of slots in communication between said first source and said shuttle bore; and
   said shuttle valve is configured to variably restrict the flow of liquid through said number of slots into said shuttle bore in response to movement of said thermostat actuator.

8. The thermostatic mixing valve of claim 6, further comprising:
   a backseat valve configured to restrict flow from the second source into said first bore, said backseat valve connected to said shuttle valve; and
   means for moving said backseat valve to close said first bore upon failure of said thermostat.

9. The thermostatic mixing valve of claim 8, wherein:
   said backseat valve and said shuttle valve are disposed on opposite sides of said first bore; and
   said means for moving includes a spring disposed between said valve liner and said shuttle valve, said spring arranged to push said shuttle valve in a direction away from said first bore.

\* \* \* \* \*